W. E. BEEDE.
ELECTRICAL MEASURING INSTRUMENT.
APPLICATION FILED APR. 8, 1911.
1,029,042.
Patented June 11, 1912.
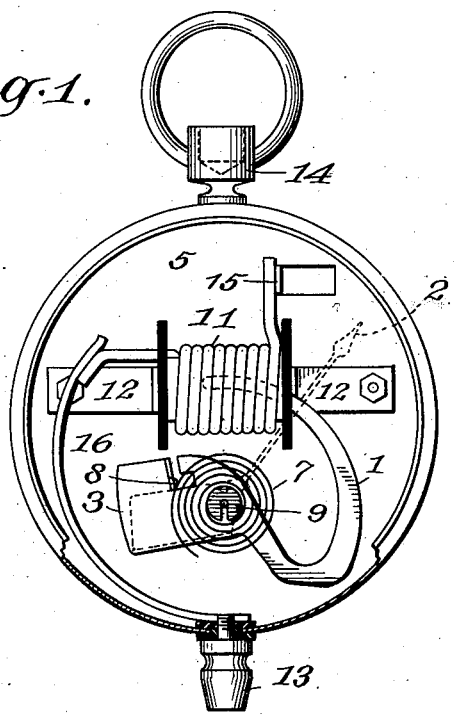
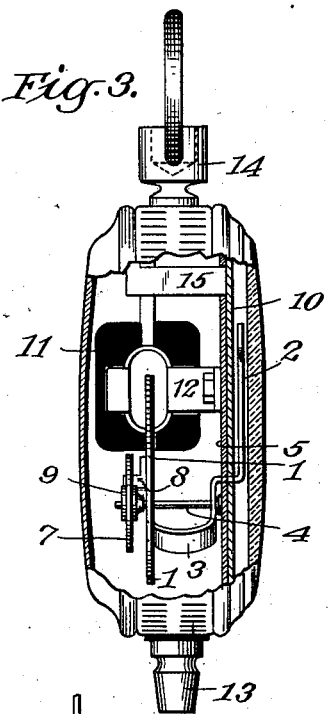
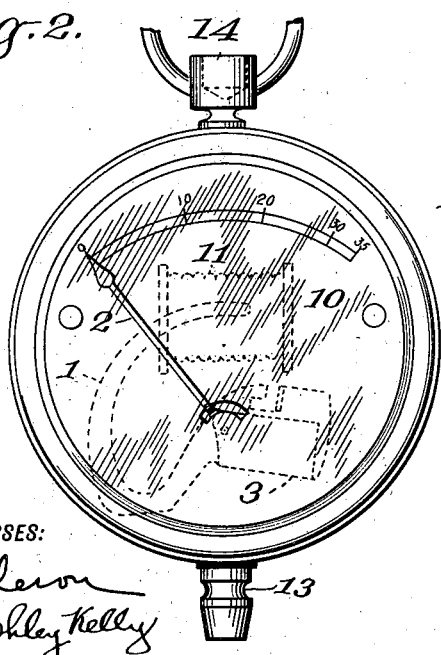
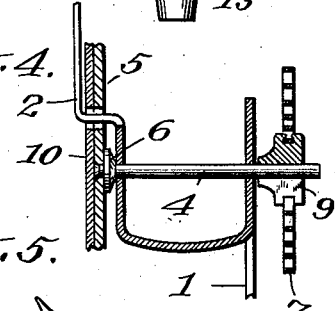
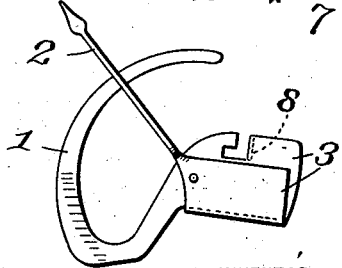
WITNESSES:
H. Crockeron
Wm. Ashley Kelly
INVENTOR
Walter E. Beede
BY
Henry D. Williams
ATTORNEY

UNITED STATES PATENT OFFICE.

WALTER E. BEEDE, OF NEW YORK, N. Y.

ELECTRICAL MEASURING INSTRUMENT.

1,029,042.  Specification of Letters Patent.  Patented June 11, 1912.

Application filed April 8, 1911. Serial No. 619,679.

*To all whom it may concern:*

Be it known that I, WALTER E. BEEDE, a citizen of the United States, residing in the borough of Manhattan, city of New York, in the county of New York and State of New York, have invented certain new and useful Improvements in Electrical Measuring Instruments, of which the following is a specification, reference being had therein to the accompanying drawings, forming part thereof.

My invention relates to electrical measuring instruments, more particularly portable electrical measuring instruments such as may be made in small dimensions adapted to be carried in the pocket and which in general appearance resemble a watch.

Among the principal objects of my invention are accuracy and sensitiveness of indication; durability; reliability of operation, including non-liability to derangement; simplicity of construction; and inexpensiveness of manufacture.

Other objects of my invention will hereinafter appear.

My invention includes an armature, a pointer and a counterbalance, all in one piece, such as a piece of sheet metal stamped in proper shape and bent to provide spaced bearing points and to bring the armature and the pointer into different parallel planes; for example, the bent piece could have a portion of U-shape transversely, with the pointer projecting from one leg of the U and the armature from the other U-leg. This form of combined armature, pointer and counterbalance renders it practicable to employ a stationary arbor, which is also a feature of my invention.

My invention also includes improved means for adjusting the armature spring, such as a spring-anchor member rotatively adjustable on the stationary arbor, and such member may be a split anchor-disk having frictional engagement with the arbor and accessible for convenient adjustment.

My invention also includes several features of construction and combinations of parts, as will appear from the following description.

I shall now describe the instrument illustrated in the accompanying drawings and embodying my invention and shall thereafter point out my invention in claims.

Figure 1 is a rear view of the instrument with the rear cover removed and the casing partly broken away. Fig. 2 is a front view of the instrument. Fig. 3 is an edge view from the right of Fig. 1 and from the left of Fig. 2 and with the casing partly broken away. Fig. 4 is an enlarged partial central vertical section as viewed from the left in Fig. 1 and from the right in Fig. 2. Fig. 5 is a detail elevation of the combined one-piece sheet metal armature, pointer and counterbalance as it appears in Fig. 2.

The instrument illustrated in the drawings has an armature 1, a pointer 2 and a counterbalance 3 for the armature and pointer, all composed of a single piece of bent sheet metal. The bent metal piece forming these parts has a transversely U-shaped portion which provides separated bearing points or spaced pivotal points and also serves to separate or to bring into different planes the armature 1 and the pointer 2, such U-shaped portion being extended to form the counterbalance 3.

The combined armature and pointer and counterbalance is rotatively mounted on a stationary arbor 4 rigidly projecting from a support shown as a base plate 5 through which it passes and the end of which is shown as upset (Fig. 4). A combined strengthening and bearing collar 6 surrounds the arbor 4 in contact with the base plate 5 and spaces the base of the pointer plate from the plate 5, this collar having an outwardly tapered outer surface forming a reduced bearing surface for the pointer 2. The fact that the armature, the pointer and their counterbalance are in one piece renders it practicable to employ the rigid stationary arbor, upon which these parts, as a single piece, are loosely rotatively mounted. This greatly simplifies the construction and economizes in manufacture, and also conduces to other advantageous results presently to appear.

The pointer 2 is normally maintained at zero indication by a hair-spring 7 shown as connected at a point in its outer coil with the rotative piece which includes the armature, and at its inner end is adjustably connected to the stationary arbor 4. The spring 7 is soldered to an L-shaped lug 8 shown as struck up from the adjacent side of the counterbalance 3, leaving therein a notch of the same shape as the part struck up (Figs. 1, 2 and 5). At its inner end the hair-spring 7 is secured to a spring-anchor rotatively adjustable on the arbor 4, such spring-anchor being shown as a split anchor-disk 9 frictionally engaging the free end portion of the arbor outwardly from the armature 1, so as to be readily accessible for adjustment to bring the pointer 2 to the zero indication. The stationary arbor 4 renders it possible to employ this simple and convenient means for effecting the spring adjustment. The object of securing the spring 7 to the lug 8 at a distance from the end of the spring is to permit this point of connection to be changed in either direction should a test show that the spring is not of proper strength. Such readjustment would of course be effected in the course of manufacture, and would require resoldering of the connection. The disk 9 is tapered to provide a reduced bearing surface for the armature 1, which, together with the pointer 2 and counterbalance 3, it retains in proper operative position on the arbor 4. The pointer 2 is bent (see Figs. 3 and 4 more particularly) so as to pass out through registering arcuate slots cut in the base plate 5 and in a suitably calibrated dial 10 immediately overlying the base plate 5 and over which the pointer 2 has indicating movement.

A conductive coil 11 controls or influences the armature 1, such coil being shown as a flattened solenoid and the armature 1 being shown as a core for the solenoid, such core having a tapered portion concentric with the arbor 4 and entering the solenoid 11, and also having a supporting portion connecting the tapered curved portion with the adjacent side of the U-shaped counterbalance 3. The solenoid 11 is shown as held in place on the base plate 5 by a sheet metal strip 12 secured by small bolts. A blank for forming the one-piece combined armature and pointer and counterbalance may be stamped from a flat sheet of homogeneous magnetic metal, such as iron, the magnetic properties of the pointer 2 and counterbalance 3 being negligible, chiefly because of their neutral location in reference to the coil 11, although, of course, if necessary proper allowance could be made for this factor in designing the parts.

The instrument is provided with a contact terminal 13 shown as extending through the annular wall of the casing and as insulated therefrom. In using the instrument any part of the casing could be employed as the other contact terminal, but usually a separate contact terminal is employed having a short flexible conductor terminating in a plug adapted to be inserted in a socket shown (by broken lines) as formed in the stem 14. The electrical circuit of the instrument may be traced from the inclosing casing through the conductive coil 11 to the contact terminal 13, or vice versa. Starting, for example, from the casing, the circuit leads from the base plate 5, forming a part of the casing, through a struck up standard 15, to which one terminal of the coil is soldered, through the coil 11 to the other terminal thereof soldered to a curved metal strip 16 which is connected, as by screw-threading, as shown (Fig. 1), with the contact terminal 13.

It is obvious that various modifications may be made in the construction shown in the drawings and above particularly described within the principle and scope of my invention.

I claim:
1. An electrical measuring instrument comprising a stationary arbor, an armature and a pointer and a counterbalance for the armature and for the pointer all formed in one piece and pivotally mounted on the arbor, a spring connected to such piece and adjustably connected to the arbor and a conductive coil controlling the armature.

2. An electrical measuring instrument comprising a stationary arbor, an armature and a pointer and a counterbalance for the armature and for the pointer all formed in one piece and pivotally mounted on the arbor, a conductive coil controlling the armature, and means opposing the influence of the conductive coil on the armature.

3. An electrical measuring instrument comprising a base plate, a stationary arbor rigidly projecting from the base plate, a one-piece combined armature and pointer and counterbalance rotatively mounted on the arbor, a conductive coil controlling the armature, a split anchor-disk frictionally mounted on the free end of the arbor outwardly from the rotative piece including the armature so as to be frictionally rotatively adjustable on the arbor, and a spring connected to such rotative piece and also connected to the anchor-disk and arranged to oppose the conductive coil.
4. A combined one-piece armature and pointer and counterbalance formed of a single piece of sheet metal.

5. A combined one-piece armature and pointer and counterbalance formed of a single piece of sheet metal and having a portion of U-shaped transverse section from the opposite sides of which the armature and the pointer project, respectively.

6. A combined one-piece armature and pointer and counterbalance formed of a single piece of sheet metal and in which the counterbalance is of U-shaped transverse section and in which the armature and the pointer project, respectively, from opposite sides.

7. An electrical measuring instrument comprising a stationary arbor, a combined one-piece armature and pointer and counterbalance formed of a single piece of sheet metal and having a transversely U-shaped portion pivoted at spaced bearing points on the arbor and in which the pointer projects from one side and the armature from the other side of the U-shaped portion, a conductive coil controlling the armature, and means opposing the influence of the conductive coil on the armature.

8. An electrical measuring instrument comprising a base plate, a stationary arbor rigidly projecting from the base plate, a combined one-piece armature and pointer and counterbalance formed of a single piece of sheet metal and having a transversely U-shaped portion pivoted on the arbor and extended to form the counterbalance and from which the pointer projects at one side of the U-shaped portion and the armature from the other side thereof, a conductive coil controlling the armature, a split anchor-disk frictionally mounted on the arbor outwardly from the pivoted piece which includes the armature so as to be frictionally rotatively adjustable on the arbor, and a spring connected to the anchor-disk and also connected to such pivoted piece and arranged to oppose the influence of the conductive coil on the armature.

In testimony whereof I have affixed my signature in presence of two witnesses.

WALTER E. BEEDE.

Witnesses:
WM. ASHLEY KELLY,
ELIAS ISAACS.